United States Patent Office

3,553,112
Patented Jan. 5, 1971

3,553,112
EXPANDABLE ALKENYL AROMATIC POLYMERS CONTAINING INCORPORATED EXPANDABLE ALKENYL AROMATIC POLYMERS
Jerry L. Weinstein, Framingham, and Michal Niechwiadowicz and Hugh C. Crall, Leominster, Mass., assignors to Foster Grant Co., Inc., Leominster, Mass., a corporation of Delaware
No Drawing. Filed Sept. 14, 1967, Ser. No. 667,652
Int. Cl. C08f 47/10; C08j 1/26
U.S. Cl. 260—2.5
8 Claims

ABSTRACT OF THE DISCLOSURE

Expandable alkenyl aromatic polymers containing 1 to 40% of expandable alkenyl aromatic polymer co-reacted therein, and processes for their manufacture.

---

This invention relates to expandable compositions having utility in various manufactured articles. More particularly it relates to such thermoplastic compositions formed from alkenyl aromatic polymers obtained from corresponding monomers having 1 to 40% of similar expandable polymer dissolved there.

The term alkenyl aromatic polymers includes thermoplastic polymers and copolymers containing in chemically combined form at least 55% by weight of a monoalkenyl aromatic compound having the general formula:

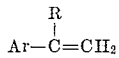

wherein Ar represents a monovalent aromatic radical and R represents hydrogen or the methyl radical. Examples of such of such alkenyl aromatic resins are the solid homopolymers of styrene, Ar-vinyl toluene, Ar-vinyl xylene, and Ar-ethylvinyl benzene; the solid copolymers of two or more of such alkenyl aromatic compounds with a minor amount of other polymerizable olefinic compounds.

Polystyrene containing pentane or the like is used in making molded articles and in the preparation of expanded cellular insulation, but for many uses it has the disadvantage of requiring a narrow range of molding conditions, giving coarse or non-uniform pre-puff cell size, or having crystallinity, or a combination thereof. Attempts to produce such compositions without these disadvantages have resulted in an undesirable decrease in important properties of the polymer, such as poor shelf like, lumping during pre-expansion, excessive water pick-up and clumping during pre-expansion, coarse and non-uniform cell structure in the pre-puff and poor molding characteristics (poor fusion, slow setting, long cooling cycle, or collapse or post expansion of the molded article, or a combination thereof).

The foregoing and other disadvantages are remedied by the present invention, an object of which is to provide new, expandable styrene polymer materials, which give a pre-puff of fine and uniform cell size and free from crystallinity. A further object of the invention is to provide a process by means of which such styrene polymer materials can be prepared in a convenient way. A specific object of the invention is to provide expandable styrene polymer materials containing a minor amount of expandable polymer reacted therein and a process for the production of such styrene polymer materials. Other objects of the invention will be obvious in view of details or embodiments of the invention as set forth hereinafter.

These objects are achieved by providing styrene polymers or the like having 1 to 40% of similar expandable polymer intimately reacted therein. It is preferred to add the said expandable polymer in particulate form to the monomeric styrene or the like and to polymerize this mixture in accordance with usual suspension polymerization methods. In this way neither the molecular weight nor the softening range of the styrene or the like polymer material is undesirably altered.

The following examples illustrate ways in which the principle of the invention are applied, but are not to be construed as limiting its scope. The parts and percentages specified in the examples are parts and percentages by weight, unless otherwise indicated.

EXAMPLE 1

There are charged into a jacketed vessel equipped with an agitator 100 parts by weight of water. Next the agitation is commenced and the pH of the water is adjusted to 3.0 by adding nitric acid. The agitation is of the usual type for suspension polymerization to give beads in the diameter range of about 0.25 to 2.5 mm. Then, the water temperature is raised to 195° F. and 78.00 parts of styrene, 15.00 parts of expandable polystyrene beads (in the above diameter range), 0.165 part of benzoyl peroxide and 0.085 part of tertiary butyl peracetate are added thereto. Next 0.05% of polyvinyl alcohol, based on the weight of the total charge, is added (as an aqueous solution) to the reactor charge and the polymerization is carried on at 195° F. The toluene solution viscosity of the added beads is substantially identical to that of the final product as obtained below.

When the polymer content (methanol insolubles) of the reacting mixture is about 70%, the reactor is pressurized to 15 p.s.i.g. and pentane (6.75 parts) is added to the contents of the reactor over a period of 10 minutes and the reaction is continued at 195° F. for 2 hours. Then the reaction temperature is raised to 240° F. and polymerization is continued thereat for 5 hours. Lastly, the reactor charge is cooled to below 125° F., washed with water and dried.

The following advantages accrue from the use of expandable polystyrene resin in the above formulation:

(a) The product upon pre-expansion, yields (pre-puffs or discrete pre-expanded particles) having very fine and uniform cell size of 5-6 mils compared with 17-25 mils for a control product—see comparative Example A below.

(b) The pre-expanded particles possess improved molding characteristics and can be molded under a wide range of conditions without signs of thermal collapse or inadequate fusion. This results in practically no rejects in commercial operation.

(c) The duration of the polymerization cycle is 11.75 hours compared with 13 hours for the control run in which no expandable polystyrene resin is used.

COMPARATIVE EXAMPLE A

The procedure of Example 1 is repeated using 92.465 parts of styrene (instead of 78.00), no expandable polystyrene, 0.20 part of benzoyl peroxide (instead of 0.165) and 7.25 parts of pentane (instead of 6.75) while the amounts of other ingredients remain unchanged.

The duration of the polymerization cycle is 13 hours.

Upon pre-expansion, the product yields pre-puffs or particles having large and non-uniform cells whose size ranges from 17 to 25 mils (diameter or equivalent wall to wall dimension). Furthermore, the pre-expanded particles are undesirably sensitive to molding conditions. In molding complicated articles of varying thickness, the tolerable variation in the range of the maximum steam pressure in the steam chest, for satisfactory molding, is between 1.5 and 2.0 p.s.i., e.g. 22 to 23.5 or 24 p.s.i.g. This is a serious economic handicap, especially where there are large losses due to rejects.

These unique results as to the product quality are indeed surprising. The obtention of both such fine and such uniform cell size appears directly contrary to prior art teachings requiring finely divided resinous wax dispersed as a separate phase. Such a wax is regarded as a necessary nucleating agent in this prior art.

If the expandable polystyrene is replaced by non-expandable polystyrene, the results are no better than the control.

The reduction in polymerization cycle time is a most noteworthy advantage per se. This is evident from the above example and the comparative run, even if one considers only the monomer reacted. From the commercial viewpoint, this means substantially increased output from equipment of a given size.

The invention provides a combination of both unexpectedly better quality and distinctly greater output.

EXAMPLE 2

The procedure of Example 1 is repeated except that 68.00 parts of styrene (instead of 78.00 parts) and 25.00 parts of expandable polystyrene beads (instead of 15.00) are used.

The product is identical in all respects with the product of Example 1. Furthermore, the duration of the polymerization cycle is 11 hours compared with 13 hours for the control run.

EXAMPLE 3

The procedure of Example 1 is repeated except that 58.10 parts of styrene (instead of 78.00), 35.00 parts of expandable polystyrene beads (instead of 15.00) and 0.155 part of benzoyl peroxide (instead of 0.165) are used.

This product has all the desirable features of the product of the Example 1, and the duration of the polymerization cycle is 10 hours compared with 13 hours for the control run.

EXAMPLE 4

The procedure of Example 1 is repeated, except that 82.988 parts of styrene (instead of 78.00), 10.00 parts of expandable polystyrene beads (instead of 15.00) and 0.177 part of benzoyl peroxide (instead of 0.165) are used.

The product has all the desirable features of the product of the Example 1 and the duration of the polymerization cycle is 12.25 hours compared with 13 hours for the control run.

In analogous runs, the polyvinyl alcohol is added when the polymer content of the reaction mixture is 20% or 30%, or 40% and similar results are obtained.

EXAMPLE 5

The procedure of Example 1 is repeated using 87.727 parts of styrene (instead of 78.00), 5.00 parts of expandable polystyrene beads (instead of 15.00), 0.188 part of benzoyl peroxide (instead of 0.165) and 7.00 parts of pentane (instead of 6.75) while the amounts of other ingredients remain unchanged.

The product has all desirable features of the product of the Example 1, and the duration of the polymerization cycle is still 25 minutes shorter than that of the control run.

EXAMPLE 6

The procedure of Example 1 is repeated using 90.47 parts of styrene (instead of 78.00), 2.00 parts of expandable polystyrene beads (instead of 15.00), 0.195 part of benzoyl peroxide (instead of 0.165) and 7.25 parts of pentane (instead of 6.75) while the amounts of other ingredients remain unchanged.

The product, upon pre-expansion, yields particles having fine and uniform cell size (5 to 6 mils).

EXAMPLE 7

The procedure of Example 3 is repeated except that the expandable polystyrene bead ingredient is added 1.5 hours after the start of the polymerization, and similar results are obtained. Preferably, the addition of blowing agent takes place later than the final addition of the polymer ingredient.

From these results, it is evident that the invention substantially avoids one or more prior art drawbacks in a surprisingly advantageous manner.

COMPARATIVE EXAMPLE B

The procedure of Example 1 is repeated using 15 parts of non-expandable polystyrene beads (crystal polystyrene fines), having 10% toluene solution viscosity of 25.4 centipoises, instead of expandable polystyrene. The styrene monomer and polystyrene fines are dissolved at 95° F. for 3 hours prior to addition of the initiators and commencement of polymerization.

Upon pre-expansion, the product yields pre-puffs having non-uniform cells with cell sizes from 4 mils in the surface layers to 17 mils inside the particle. Furthermore, the pre-puff particles have a high degree of crystallinity.

The results of Comparative Example A show that if the expandable polystyrene is replaced with non-expandable polystyrene, the results are no better than the control.

Comparable results to the foregoing are achieved by various modifications thereof, including the following. The present invention is employed to polymerize a charge consisting of at least 55%, and preferably 70 to 100%, of at least one monoalkenyl aromatic monomer compound. Up to 45% of the polymer charge can be another ethylenically unsaturated compound copolymerizable with the monovinyl aromatic compound. The monovinyl aromatic compound is preferably styrene although vinyl naphthalenes, vinyl aryl compounds or their substituted products may also be employed. Examples of substituted vinyl aryl compounds include: halogenated styrenes such as mono- and di-chloro, mono and di-bromo, or fluoro-styrenes; alkyl, alkenyl, aryl, aryl-alkyl, alkyl-aryl and cycloaliphatic substituted materials, as for example, mono- and dimethyl-styrene, and ethyl-styrene. A combination of monovinyl aromatic compounds can also be employed. The ethylenically unsaturated compound copolymerizable with the monovinyl aromatic can include any of a variety of monomers known to be copolymerizable with vinyl aryl compounds. Examples thereof include the esters (preferably the alkyl esters) of acrylic acids, methacrylic acids and itaconic acid, such as ethyl acrylate, methyl methacrylate, and the like, the nitrile derivatives of acrylic and methacrylic acids, e.g., acrylonitrile, methacrylonitrile, and the like, all of which are well known in the art for the purposes of copolymerizing with monovinyl aromatic compounds. The polymerization of styrene monomer is preferred.

The amount of added expandable polymer is at least 1%, based on the monomer charge and 40% is a practical upper limit. However, even higher amounts may be added if efficient agitation or mixing equipment is used. About 5 to 30% is a preferred range. The higher amounts in these ranges are desirable because shorter process cycle times are required therewith.

The expandable bead ingredient may be of any thermoplastic alkenyl aromatic polymer of the similar types already discussed. It may be from an identical or a different monomer or monomers of these types. Instead of beads, any convenient particulate form of polymer may be used, e.g., pellets, granules and the like.

The molecular weight is related to the viscosity of a 10% by weight solution of the polymer in toluene at 25° C. Generally, all the useful solid polymers of the alkenyl aromatic types may be made in accordance with the invention. The molecular weights thereof may be in the range of 25,000 up to 500,000 or an even wider range.

In a preferred modification of the invention, the expandable polymer ingredient is of a toluene solution viscosity within 5 centipoises of the solution viscosity of the ultimate product. This enables better product quality control on a commercial basis. A viscosity within 5 centipoises indicates that the molecular weight of the added polymer is substantially identical with that of the final product.

Generally, its particle size should be in the range of 0.05 to 10.0 mm. average diameter. Larger size particles may be used, especially with efficient mixing equipment, but are not indicated for economic and quality control reasons. Even very fine particles are suitable; e.g. of the size of dust or the like.

Preferably, the expandable polymer ingredient should be capable of expansion to about 50 times its original volume (in air). However, partially expanded material which is still further expandable may be used. From the processing and handling viewpoint, the rather low density expandable material is less desirable than the denser material.

A critical feature of the invention is that the added polymer is expandable when added. For process advantage, it should be expandable under the reaction temperature conditions, e.g., when it is added, or if in a cold reaction mixture, when the temperature thereof is raised sufficiently. Generally, expansion may occur at some point or stage of the reaction procedure. Addition of the expandable polymer to hot reaction mixture is preferred from the process viewpoint, especially in view of the shorter reaction time associated therewith.

In a preferred modification, the process is initiated by dispersing in water a solution or mixture of the expandable polymer in the monomer with the initial stages of the polymerization being conducted at temperatures under 100° C., preferably temperatures within the range of 70° to 95° C. It is preferred to employ polyvinyl alcohol as the suspending agent, although other conventional suspending agents can be employed, such as tricalcium phosphate or other difficulty soluble phosphates, calcium carbonate, carboxymethyl cellulose, hydroxyethyl cellulose, polyvinylpyrolodone, aluminum oxide, magnesium silicate, and the like, all of which are well known for this purpose. It is preferred to add the suspending agent on a delayed basis, i.e., when the polymer content has reached about 20 to 55%, which normally may be up to about 5 hours after the reaction mixture reaches the desired polymerization temperature, e.g., ordinarily about 70° to 95° C. If enough expandable polymer is added to give the desired polymer content, the suspended agent is added promptly thereafter. The pH of the polymerization may be varied depending on the suspending agent employed, e.g., pH of 5 or greater for tricalcium phosphate. When 50 to 80% preferably 60 to 75% polymer content, has been obtained, the volatile liquid blowing agent is added rapidly to the reaction system in a period of 2 to 30, preferably 5 to 20 minutes.

Suitable volatile liquid blowing agents generally having boiling points of from about 15 to approximately 100° C. are employed. Such agents are well known in the art. "Petroleum ethers" are particularly preferred, with those boiling within the range of 35° to 65° C. conventionally known as the "pentane" fraction being especially suitable. Such a fraction generally contains at least 70% normal pentane. Petroleum ethers boiling in the range of 65° to 72° C. denoted as the "hexane" fraction and those boiling in the range of 95° to 100° C., such as for example, pentane, hexane, heptane, cyclopentane, and the like, or mixtures of such hydrocarbons as occurs in the petroleum ether fractions.

The volatile organic compound can be a liquid or gas at ordinary temperatures and pressures, i.e., at atmospheric conditions. The compound should be a nonsolvent or poor solvent of the polymer. It should have a molecular weight of at least 56 or greater and a molecular size such that it does not readily diffuse from the solid polymer.

The product generally has 3 to 10, preferably 4 to 8% of the following volatile blowing agent incorporated therein. The quantity of blowing agent can be varied and is sufficient to cause the desired degree of expansion by the end users. Since there is generally little loss of volatile blowing agent, the amount of blowing agent added is about 3 to 10 weight percent of the monomer employed.

Just prior to the addition of the volatile liquid blowing agent, the reactor may be pre-pressured with an inert and non-condensable gas to insure avoidance of undesired porosity or voids in the polymer particles. Alternatively this pressurization may be effected immediately after the addition of the volatile liquid blowing agent and before the bulk of the blowing agent has been absorbed by the polymer beads.

Thereafter the second stage of the polymerization is effected at temperatures of about 95° C. or above, desirably in the range of 95° to 145° C., especially 95° to 140° C.

As is conventional, a catalyst or initiator is added to promote the first stage polymerization. Typical examples of such initiators are benzoyl peroxide and its derivatives, such as para-chlorobenzoyl peroxide, and the like. To help catalyze the second stage of the polymerization further amounts of peroxide catalysts may be added to the polymerization zone. The second stage catalyst may be added at the beginning or at the latter part of the first stage polymerization, and preferably the peroxide catalyst is added along with the blowing agent, especially if the catalyst is soluble in the blowing agent. If the initiator is benzoyl peroxide or a similar initiator which readily reacts at temperatures under 100° C., the initiator for the second stage of polymerization must be added at or about the beginning of the second stage for catalysis of the second stage polymerization to be effective.

However, in another embodiment of the present invention, a second catalyst having a half-life value considerably higher than that of benzoyl peroxide can be used to promote the second stage reaction. In this embodiment, the second stage catalyst has a half-life value of more than 1 hour at 100° C. in benzene (preferably about 3 hours, in contrast to the 0.4 hour half-life value of benzoyl peroxide at 100° C. in benzene). In this embodiment the catalyst can be added at the beginning of polymerization or prior to the second stage reaction, since it will not substantially decompose at temperatures of 80° to 95° C. as used in the first stage polymerization, but will only exercise its catalytic effect at the higher temperatures (which characterize the second stage of polymerization).

Examples of such preferred second stage catalysts are tertiary butyl peracetate, cyclohexanone peroxide, 2,5-dimethyl-2,5-bis (benzoyl peroxy) hexane, di-tertiary butyl peroxide, di-tertiary butyl diperphthalate methyl ethyl ketone peroxide, dicumyl peroxide, hydroxyheptyl peroxide, and the like.

The second stage polymerization which takes place generally at temperatures of 95° C. to 145° C. is conducted to effect virtually 100% complete conversion. After completion of the polymerization, the polymerization mixture is cooled in the reactor so as to preclude premature expansion of the expandable particles upon discharge from the reactor. The products formed in accordance with the present process are polymer beads, capable of expansion upon heating with steam, or the like. The beads may then be removed from the polymerization mixture, washed thoroughly, and dried following conventional processing techniques. The product may be of any usual bead type or the like as to particle size. A suitable range is 0.25 to 2.5 mm. average diameter.

Where all the advantages of the invention are not required, alternative polymerization procedures may be used, as known in the art, including bulk polymerization with simultaneous or supplemental addition of blowing agent, and comminution of any solid material as desired, in known manner. This applies equally to the preparation of expandable polymer for addition to a polymerization charge. In a sequential batch operation, a part of the product of one batch may be used or recycled as the expandable ingredient for the next batch.

In general the first stage polymerization conducted at temperatures of less than 100° C. is effected for periods of 2 to 10 hours, depending upon catalyst, to obtain 50 to 90% conversion. The second stage polymerization is preferably conducted at temperatures above about 95° C. to complete the polymerization after addition of the volatile liquid blowing agent, and is generally effected over a period of 1 to 10, preferably 3 to 5 hours, as required.

If desired, general self-extinguishing agents, anti-coalescing agents and the like may be included. A desirable self-extinguishing agent is tetrabromobutane. For best results, 0.6 to 0.9% is used based on the weight of the polymer in the final composition. A wider range of 0.4 to 2.0% is usable, especially with the higher proportions of blowing agent; and 0.5 to 1.5% is a practical range for use with a median concentration of blowing agent.

The anti-coalescing agents are characterized in that they do not have a deleterious effect on the expanded resin particles or the final product. Examples of such anti-coalescing agents are magnesium stearate, zinc stearate, calcium stearate, sodium stearate, aluminum stearate, butyl stearate, stearic acid, sodium oleate, talc, tricalcium phosphate, potassium lauryl sulfate, diatomaceous earth, and combinations of two or more thereof.

Polymerization of the monomers can be effected in the presence of various other agents to provide an ultimate polymer product containing such an agent or agents. Examples of such other agents include dyes, plasticizers and the like.

Having described the present invention, that which is sought to be protected is set forth in the following claims.

We claim:

1. A process for preparing an expandable alkenyl aromatic polymer composition comprised of 3.0 to 10.0% by weight of volatile blowing agent comprising polymerizing alkenyl aromatic monomer material having distributed therein about 1.0 to 40%, based on the weight of monomeric material, of expandable alkenyl aromatic polymer, said expandable polymer having been added to said monomer in particulate form, and introducing said blowing agent at any stage of the process.

2. The process of claim 1 wherein the alkenyl aromatic monomeric material is comprised of at least 70% styrene.

3. The process of claim 2 wherein the alkenyl aromatic monomer is styrene and the distributed expandable alkenyl aromatic polymer is polystyrene having a molecular weight substantially identical with that of said expandable alkenyl aromatic polymer composition.

4. The process of claim 1 carried out in aqueous suspension.

5. The process of claim 4 wherein a suspending agent is first added when the polymer content is at least 20% of the reaction material.

6. The process of claim 4 wherein said expandable alkenyl aromatic polymer is first added when the polymer content is at least 15% of the reaction mixture.

7. The process of claim 6 carried out in two stages wherein first stage and second stage catalysts are added initially.

8. The process of claim 1 wherein the alkenyl aromatic monomer material is comprised of at least 55% of at least one alkenyl aromatic monomer and up to 45% of another ethylenically unsaturated compound copolymerizable with said alkenyl aromatic monomer.

References Cited
UNITED STATES PATENTS

| | | | |
|---|---|---|---|
| 2,681,321 | 6/1954 | Stastny et al. | 260—2.5B |
| 2,744,291 | 5/1956 | Stastny et al. | 260—2.5B |
| 3,185,588 | 5/1965 | Resnick | 260—2.5B |

MURRAY TILLMAN, Primary Examiner

M. FOELAK, Assistant Examiner

U.S. Cl. X.R.

260—23, 41, 45.7